UNITED STATES PATENT OFFICE.

CHESTER L. WHITAKER, OF MOUNT VERNON, NEW YORK, ASSIGNOR TO MUNSON-WHITAKER COMPANY, OF NEW YORK, N. Y., A CORPORATION OF MASSACHUSETTS.

COMPOSITION FOR TREE SURGERY.

1,085,652.   Specification of Letters Patent.   Patented Feb. 3, 1914.

No Drawing.   Application filed January 7, 1913. Serial No. 740,698.

*To all whom it may concern:*

Be it known that I, CHESTER L. WHITAKER, a citizen of the United States, residing in Mount Vernon, Westchester county, State of New York, have invented certain new and useful Improvements in Compositions for Tree Surgery, of which the following is a specification.

In accordance with the method of treating cavities in trees now commonly followed, a cavity to be treated is thoroughly cleared of all decayed wood, its walls are treated with a suitable fungicide to kill the mycelium threads or fungus which may have penetrated the sound wood and the cavity is then filled with a cement or cementitious material which, when set, becomes hard and stone-like; reinforcing bars are sometimes used with the cement, a proper shape is given to the top or exposed surface of the body of cement so as to carry off water, and a drainage channel is formed so as to carry off the sap which may ooze from the wood behind the cement. One theory of this method of procedure is that the cement, which becomes, when set, an absolutely unelastic and unyielding body, forms a support for the parts of the tree. In practice, however, this is not true, for although the interposition of a rigid and unyielding body between two parts of a tree may prevent the movement of those two parts toward each other, it can not prevent their movement away from each other. Furthermore, experience has shown that when the cavity is so large that the parts of the tree require support the results of repair are not often satisfactory or lasting. Again, the great weight of the body of heavy cement, such as Portland cement, is sometimes a factor in effecting breakage. Furthermore, even when reinforcing rods or bars are used, the swaying or working of a tree in the wind eventually separates the wood from the cement so that a crevice is left in which water and germs may accumulate and thus promote the renewal of the process of decay.

It is the object of this invention to overcome the difficulties due to the use of a hard setting cement or concrete for the filling of tree cavities and to provide an improved method of treatment in accordance with which a tree cavity, after being properly prepared, is filled with a material which, besides being waterproof, has approximately the same specific gravity as the wood which it replaces so that its weight shall not be a factor in the breaking down of the tree, has substantially the same coefficient of expansion as the body of the tree so that it is not differently affected by changes in temperature, and is yielding or elastic to a degree sufficient to permit it to yield with the relative movements of the portions of the tree about it, as the tree sways or works in the wind and as it grows, without causing separation between the wood and the filling material.

The method of procedure which has been found to give the most satisfactory results and the composition of the material with which the cavities are filled will now be fully explained.

The cavity which is to be treated is first cleared of all decayed wood in the usual manner and the walls of the cavity are then treated with a suitable fungicide to kill the mycelium threads or fungus which may have penetrated the sound wood. The walls of the cavity are then coated with a permanent glaze or coating of waterproof material which adheres closely to the exposed surfaces. When the cavity has been thus prepared it is filled with a moisture-proof, yielding or elastic filler which has substantially the same coefficient of expansion and substantially the same specific gravity as the wood of the tree itself.

The filler which possesses the necessary characteristics is preferably composed of paraffin, pitch, ground or plastic slate and saw-dust in proportions, by weight, as follows: one and one-half pounds of paraffin, four and one-half pounds of pitch, one pound of ground or plastic slate, and as much saw-dust as the mixture, when hot, will take up. The filler is prepared by heating the paraffin and pitch to the boiling point, stirring in the ground or plastic slate, and then adding slowly, while the mixture is kept hot, as much saw-dust as will become thoroughly saturated with the liquid, leaving no free paraffin and pitch on the one hand, and on the other hand leaving no saw-dust not saturated or coated with the mixture.

It will be understood that although certain specific materials have been mentioned as preferred ingredients of the composition or filler, various equivalents might be used in their place. Thus, instead of the paraffin might be employed any other oleaginous material which will prevent the mixture from being brittle when cool and will insure to the mixture the yielding or elastic quality necessary to the accomplishment of the purpose of the invention. The pitch may be either vegetable pitch or resin or tar or mineral pitch or tar, such as asphaltum. The pulverized or plastic slate or other pulverized mineral substance, has a tendency to harden the composition somewhat, particularly the surface, so that it will not be affected as readily by the sun's rays. The saw-dust, or other fibrous material, preferably in a granular form, makes up the bulk of the composition so that, as the saw-dust has the same specific gravity, the same qualities of elasticity, and the same coefficient of expansion as the body of the tree itself, the composition will also have approximately the same specific gravity, the same quality of elasticity and the same coefficient of expansion as the body of the tree and will therefore yield to the movements of the tree under varying wind pressure and under varying conditions of heat and cold and with the growth of the tree without separating from the walls of the cavity and therefore without leaving crevices in which water and germs may gather.

The tarry granular composition is placed in the previously prepared cavity while it is hot and is pounded into the cavity with suitable tools so as to insure an intimate contact of the composition with the walls of the cavity and the exclusion of air and the outer surface, made flush with the cambium layer of the tree, is given such finish as may be desired.

In the manufacture of the composition on a commercial scale it is prepared in the manner already described and is allowed to cool without pounding. It is then ground and packed for shipment and when desired for use is reheated in a suitable vessel to a temperature which will permit it to be packed solidly in the cavity to be filled. In some cases the material may be molded in rectangular solids which may be packed into the cavity and merely faced over with the heated composition.

I claim as my invention:—

1. The method of preparing a waterproof, air excluding and yielding filler for tree cavities which consists in heating together an oleaginous substance and a pitchy substance, mixing a pulverized mineral substance therewith while hot and adding fibrous material thereto until the heated mixture is absorbed and the fibrous material is saturated.

2. The method of preparing a waterproof, air excluding and yielding filler for tree cavities which consists in heating together paraffin and pitch, adding pulverized slate to the mixture while hot, and adding sawdust to the mixture until the mixture is absorbed and the saw-dust is saturated.

3. A composition for filling tree cavities which is waterproof, air-excluding and yielding and has substantially the same specific gravity and the same co-efficient of expansion as wood and comprises about one and a half parts by weight of an oleaginous substance, four and a half parts by weight of a pitchy substance, one part by weight of a pulverized mineral substance, and a large proportion by volume of a fibrous substance.

4. A composition for filling tree cavities which is waterproof, air-excluding and yielding and has substantially the same specific gravity and the same co-efficient of expansion as wood and comprises about one and a half parts by weight of an oleaginous substance, four and a half parts by weight of a pitchy substance, one part by weight of a pulverized mineral substance and a large proportion by volume of saw-dust.

5. A waterproof, air-excluding and yielding combination for filling tree cavities which comprises paraffin, pitch, pulverized slate and saw-dust.

This specification signed and witnessed this 31st day of December A. D., 1912.

CHESTER L. WHITAKER.

Signed in the presence of—
R. D. SAWYER,
E. B. WILLIAMS,